US007818799B2

(12) United States Patent
Chen et al.

(10) Patent No.: US 7,818,799 B2
(45) Date of Patent: Oct. 19, 2010

(54) TAMPER RESPONSE MECHANISM

(75) Inventors: Yuqun Chen, Bellevue, WA (US); Gang Tan, Brighton, MA (US)

(73) Assignee: Microsoft Corporation, Redmond, WA (US)

( * ) Notice: Subject to any disclaimer, the term of this patent is extended or adjusted under 35 U.S.C. 154(b) by 1177 days.

(21) Appl. No.: 11/420,987

(22) Filed: May 30, 2006

(65) Prior Publication Data

US 2007/0283433 A1    Dec. 6, 2007

(51) Int. Cl.
*G06F 21/00*    (2006.01)
(52) U.S. Cl. .............................. 726/22; 726/21; 726/31; 713/190
(58) Field of Classification Search .................... 726/22, 726/21, 31; 713/190
See application file for complete search history.

(56) References Cited

U.S. PATENT DOCUMENTS

| 6,067,622 | A  | * | 5/2000 | Moore ........................ 726/31 |
| 6,205,550 | B1 | * | 3/2001 | Nardone et al. ............... 726/22 |
| 6,842,862 | B2 | * | 1/2005 | Chow et al. ................. 713/190 |
| 7,076,773 | B2 | * | 7/2006 | Schmidt ...................... 717/148 |
| 7,181,603 | B2 | * | 2/2007 | Rothrock et al. ............... 713/1 |
| 7,260,843 | B2 | * | 8/2007 | Hentunen ..................... 726/22 |
| 7,430,670 | B1 | * | 9/2008 | Horning et al. ............. 713/190 |
| 2001/0013094 | A1 | * | 8/2001 | Etoh et al. ................... 712/227 |
| 2003/0172293 | A1 | * | 9/2003 | Johnson et al. ............. 713/200 |
| 2003/0182572 | A1 | * | 9/2003 | Cowan et al. ............... 713/200 |
| 2006/0031686 | A1 | * | 2/2006 | Atallah et al. ............... 713/190 |
| 2007/0006047 | A1 | * | 1/2007 | Zhou et al. .................... 714/38 |

OTHER PUBLICATIONS

Toshio Ogiso, Yusuke Sakabe, Masakazu Soshi, and Atsuko Miyaji; "Software Tamper Resistance Based on the Difficulty of Interprocedural Analysis"; Aug. 2002; pp. 1-15.*
Zimmer et al; "Time-Based Intrusion Dectection in Cyber-Physical Systems"; 2005; ACM; 4 Pages.*
Christian S. Collberg; "Watermarking, Tamper-Proofing, and Obfuscation-Tools for Software Protection"; IEEE Aug. 2002; pp. 735-746.*

* cited by examiner

*Primary Examiner*—Carl Colin
(74) *Attorney, Agent, or Firm*—Lee & Hayes, PLLC (57) ABSTRACT

A tamper response mechanism introduces a delayed failure into a program in response to detected tampering with the program. The mechanism determines a manner of responding to the detected tampering. The manner of responding may include corrupting a global pointer or using other techniques. The mechanism also determines when to respond to the tampering and implements the response at the determined time.

18 Claims, 5 Drawing Sheets

TAMPER RESPONSE MECHANISM

BACKGROUND

Software tampering is a threat to software developers and consumers by raising software piracy and security concerns. Tamper-resistant software typically contains two functional components: a tamper detection component and a tamper response component. Each of these components can be created from one or more separate modules. The tamper detection component is responsible for detecting an attempt to tamper with the software. The tamper response component implements one or more actions in response to detection of an attempt to tamper with the software.

Many typical tamper-resistant systems focus on hiding the tamper-detection code (i.e., the code that verifies the program's integrity). However, these typical tamper-resistant systems place little emphasis on the tamper response component. Since hackers often look for the weakest link to defeat the tamper-resistant system, an inadequate tamper response component may be utilized by hackers.

Systems that do include a tamper response component often apply the tamper response component immediately after the tamper detection component identifies an attempt to tamper with the software. Further, many typical copy protection systems can be easily patched out by a hacker or other individual attempting to tamper with the software.

To improve the effectiveness of a tamper-resistant system, it is desirable to separate the process of tamper detection from the process of responding to the detected tampering.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The systems and methods described herein respond to detected tampering with a program in a manner that reduces the chances of detection of the tamper response system by introducing delayed, probabilistic failures in the program. The tamper response system determines a manner of responding to the detected tampering. One manner of responding includes intentionally corrupting one or more global pointers in the program. The tamper response system also determines when to respond to the detected tampering. The response may occur at a future time and be associated with a particular event or function call. The tamper response system implements the selected response at the determined time or event.

BRIEF DESCRIPTION OF THE DRAWINGS

Similar reference numbers are used throughout the figures to reference like components and/or features.

DETAILED DESCRIPTION

The systems and methods described herein provide a tamper response system for a program that reduces the likelihood of detection of the tamper response system by introducing delayed, probabilistic failures in a program. These systems and methods corrupt certain parts of the software program's internal state at specifically-chosen locations such that the software program either fails or exhibits degraded performance. The tamper response system is blended into the software program, thereby making the system difficult for a hacker to detect.

As discussed herein, a software vendor typically develops software programs, maintains the program source code, and sells the software in the form of executable code. A legitimate user buys the software, in the form of executable code, from the vendor. A software pirate attempts to tamper with the software, for example to alter its normal operation or bypass a copy protection system.

Figure 1:
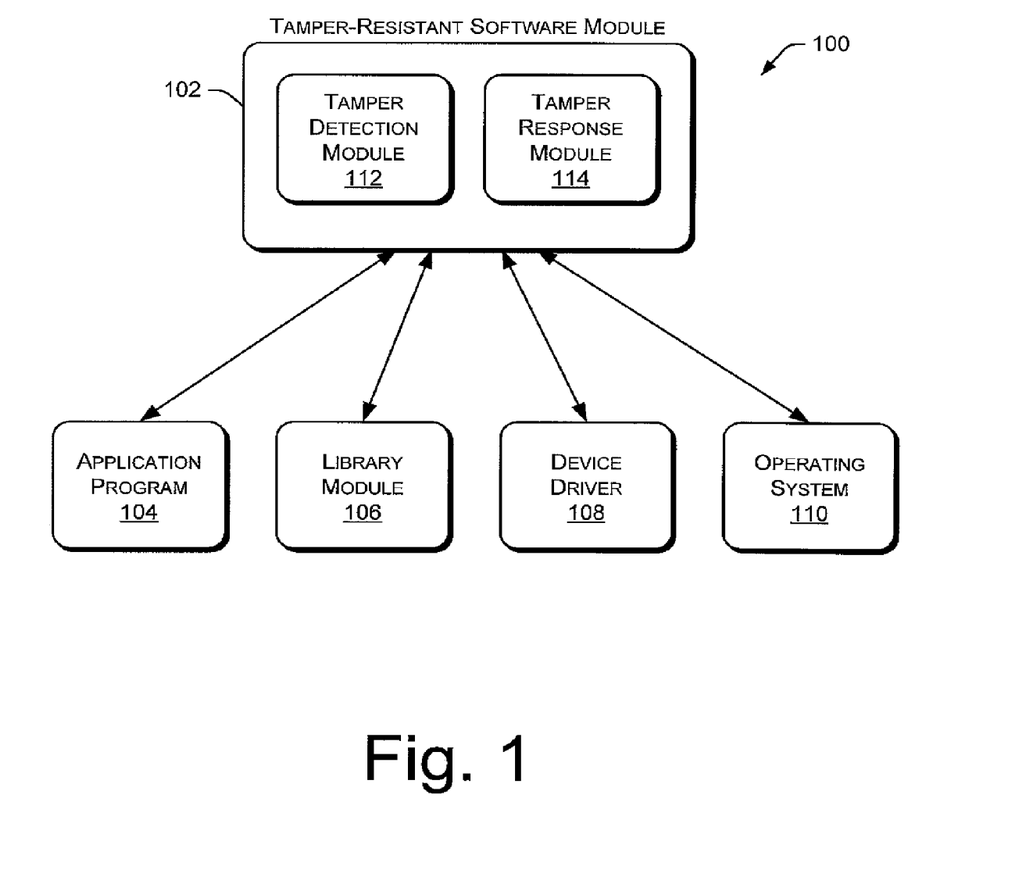
FIG. 1 illustrates a portion of an example computing environment containing a tamper-resistant software module and multiple host modules.

FIG. 1 illustrates a portion of an example computing environment 100 containing a tamper-resistant software module 102 and multiple host modules 104, 106, 108, and 110. In the example of FIG. 1, tamper-resistant software module 102 includes a tamper detection module 112 and a tamper response module 114. Tamper detection module 112 is responsible for detecting attempts to tamper with any of the host modules 104-110 or tamper-resistant software module 102. Tamper response module 114 implements one or more functions in response to detecting an attempt to tamper with any of the host modules 104-110. The functions implemented by tamper response module 114 may stop the tampering activity or render the tampered module unusable.

A particular tamper-resistant software module 102 can be coupled to any number of host modules. In the example of FIG. 1, tamper-resistant software module 102 is coupled to application program 104, library module 106, device driver 108, and operating system 110. In alternate embodiments, tamper-resistant software module 102 may be coupled to additional host modules not shown in FIG. 1. Although one tamper-resistant software module 102 is shown in FIG. 1, other implementations may include two or more tamper-resistant software modules coupled to any number of host modules.

An example system contains one or more instances of detection code in each host module. These instances of detection code communicate with the response code via covert flags. Upon detecting tampering, the detection code sets one or more flags to inform the response module of the tampering. The covert flag can take the form of a complex data structure. In one detection system, a static checksum based on either the static program code or dynamic execution traces of the code is computed and stored in a secret location. The detection system computes the new checksum when programs are running in malicious hosts, and check whether the new checksum is identical to the old checksum.

The example system also contains multiple instances of response code in the tamper-resistant software module. In one implementation, the multiple instances of response code are mutually independent such that discovering one instance of response code does not easily lead to discovering other instances of response code. The response code instances are designed such that a hacker cannot easily locate the code and cannot easily backtrack to the detection code from the response code.

To improve the effectiveness of the tamper-resistant software module, the module utilizes the principles of separation in space, separation in time, stealth, and predictability. Separation in space refers to performing tamper detection in one part of the program and causing a failure in another part of the program. This separation in space increases the difficulty of locating the detection code. For example, by increasing the number of function calls that occur between tamper detection and program failure, little trace is left for a hacker to perform any analysis. Additionally, the function where the detection code resides is not generally in the current call stack when the failure happens such that the detection code is not discovered when a debugger provides information about the current call stack.

Separation in time refers to delaying the failure of the program for a period of time after the tampering is detected. For example, the delay period may range from a few minutes to several hours or longer. Alternatively, the delay may be determined by the number of instructions executed between tampering detection and failure of the program.

The principle of stealth refers to blending the tamper-response system into the program being protected such that automatic scanning tools will not easily identify the tamper-resistant code. The stealth of a particular tamper-resistant system is context-sensitive. To improve effectiveness, the program being protected has a high statistical similarity with the response code.

The principle of predictability refers to the fact that the program that has been tampered with should eventually fail with high probability. Additionally, certain controls are used to determine where the program fails, thereby avoiding failure at sensitive points of program execution.

In a particular embodiment, a tamper response system corrupts a program's internal state to cause the program to fail. Careful selection of which portion of the state to corrupt and when to corrupt the state provides spatial and temporal separations. The deliberate use of "programming bugs" satisfies the stealth principle because the "programming bugs" look like normal bugs in a program.

As described herein, a program can have three different types of sites: detection sites (where tamper detection occurs), corruption sites (where the internal state is corrupted), and failure sites (where the failure actually happens). Detection sites and corruption sites may be associated with one another or may be separated and communicate, for example, using covert flags.

Particular examples discussed herein corrupt a program's state by corrupting the program's own variables. In alternate embodiments, various other procedures are used to corrupt a program's state. By corrupting the program's own variables, the failure of the program is predictable due to the corruption of the program's internal state. Additionally, this approach is stealthy because the response code is just an ordinary variable assignment.

When corrupting a program's variable, not all variables are good candidates to cause failure of the program. Pointer variables are typically good candidates for such corruption. If a pointer is corrupted by setting it to a NULL pointer or a value out of the program's address space, dereference of this pointer would crash the program. Further, if the next dereference happens after some time period, the failure is delayed in time.

Figure 2:
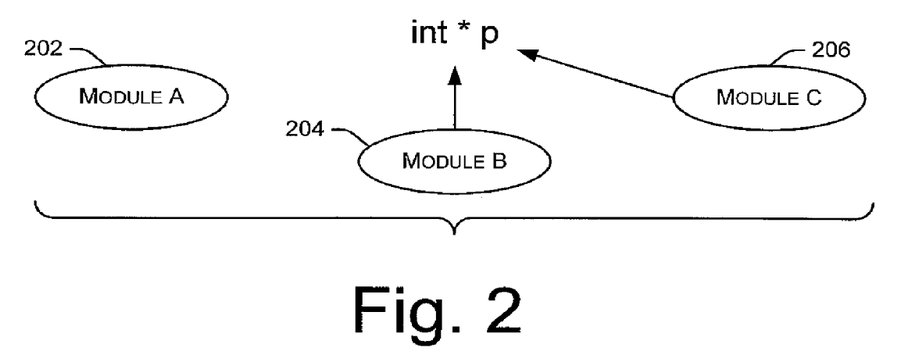
FIG. 2 illustrates an example of using global pointers.

FIG. 2 illustrates an example of using global pointers. In this example, "p" is a global pointer that is used by Module B (identified by reference number 204) and Module C (identified by reference number 206). However, pointer p is not touched by Module A (identified by reference number 202). By corrupting pointer p in Module A, then the program will continue running until Module A has finished and the program switches to Module B or Module C. Thus, corrupting the global pointer p can result in a delayed failure of the program.

To deal with a possible shortage of global pointers, the program is transformed into a semantically equivalent program that contains a level of indirection to the existing global variables. In one example, the original program code is shown below in the left column and the transformed program code is shown below in the right column.

```
int a;                          int a;
void f( ) {                     int *p_a = &a;
   a = 3;                       void f( ) {
}                                  *p_a = 3;
void main ( ) {                 }
   f( );                        void main ( ) {
   printf(' 'a = %i\n' ', a);      f( );
}                                  printf(' 'a = %i\n' ', *p_a);
                                }
```

For the global variable "a", a new pointer variable "p_a" is created. "p_a" is a global pointer variable. The value of p_a is initialized to the address of a. The system then replaces some or all uses of variable a by the dereference of the newly created pointer variable p_a. Applying this extra level of indirection to global variables allows any global variable to be used to create new pointers, thereby alleviating the shortage of global pointers. The failure behavior of the transformed program code is predictable. After p_a is corrupted, any use of variable p_a is a potential failure site. The extra level of indirection to global variables also provides control over where the program fails. For example, if it is desirable for the program to fail outside of a particular function (such as the "main" function), then variable a is not replaced with variable p_a in that particular function. The above process can be iterated to create multiple layers of references, such as p_p_a, which points to p_a, which points to global variable "a".

In addition to determining which global pointer to corrupt, a determination is made regarding where to corrupt the selected global pointer. This determination can be made by an individual or by one or more processing systems or algorithms. To identify a location for corrupting the pointer, a search algorithm analyzes the program to find a good site to set the pointer (or pointers) to nonsensical values. When analyzing the program, the search algorithm uses functions as the basic unit during the search.

Corruption of global pointers can occur inside any function body. Thus, a function body is one possible corruption site. A failure site is a function where the program fails when the program reaches that function after pointer corruption. In the example of corrupting pointers, failure sites correspond to locations where the corrupted pointers are dereferenced. To identify good corruption sites, particular embodiments search the program space to find corruption sites and failure sites with large spatial and temporal separations between one another.

When selecting a failure site, a function is selected that is not in the current call stack when the program fails. Otherwise, a hacker could use a debugging tool to trace back from the failure site to the corruption site. A tool such as a call graph is useful in avoiding such attacks. An example program is provided below, and the corresponding call graph for the example program is shown in FIG. 3.

```
int a;
int *p_a = &a;
void g1( );
void g2( );
void h( );
void f( ) {
    g1( ); g2( );
    *p_a = 3;
}
void main( ) {
    f( ); h( );
}
```

Figure 3:
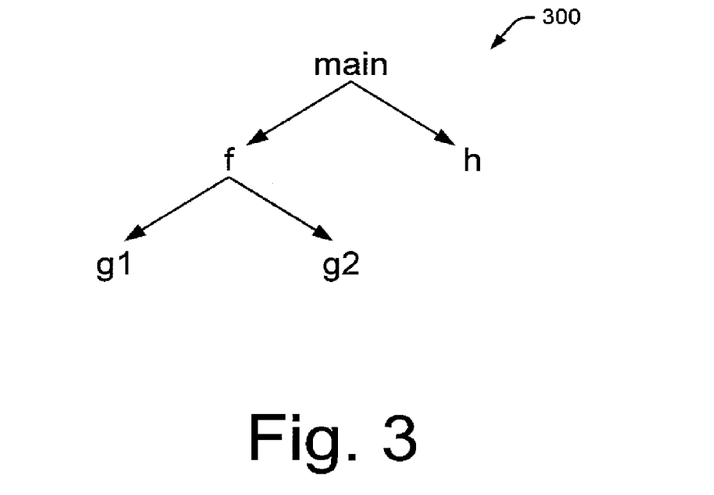
FIG. 3 illustrates an example call graph associated with a particular program.

In the above example, the "main" function calls the "f" function, resulting in a directed edge from main to f in call graph 300 shown in FIG. 3. Similarly, the f function calls the "g1" and "g2" functions, resulting in directed edges from f to g1 and from f to g2.

In one implementation, the example program shown above is corrupted by corrupting the pointer variable p_a. The function f is a failure site because it dereferences p_a. Since the program will fail in function f, the corruption should occur outside of function f. Additionally, the main function is not the corruption site because the main function should not be in the current call stack when the program fails in function f. In this implementation, the system excludes functions where the corrupted pointer variable is dereferenced, and excludes functions who are ancestors in the call graph of functions where failure can occur. This approach ensures that when the program fails, the corruption site is not in the call stack.

One approach for determining spatial and temporal separations between corruption and failure measures the average distance between two function calls in a dynamic function call and time trace. This information indicates how far a function is from the nearest failure sites (e.g., functions that dereference the pointer) in terms of both the number of function calls and time. Functions that are far from failure sites are selected as possible corruption sites.

Figure 4:
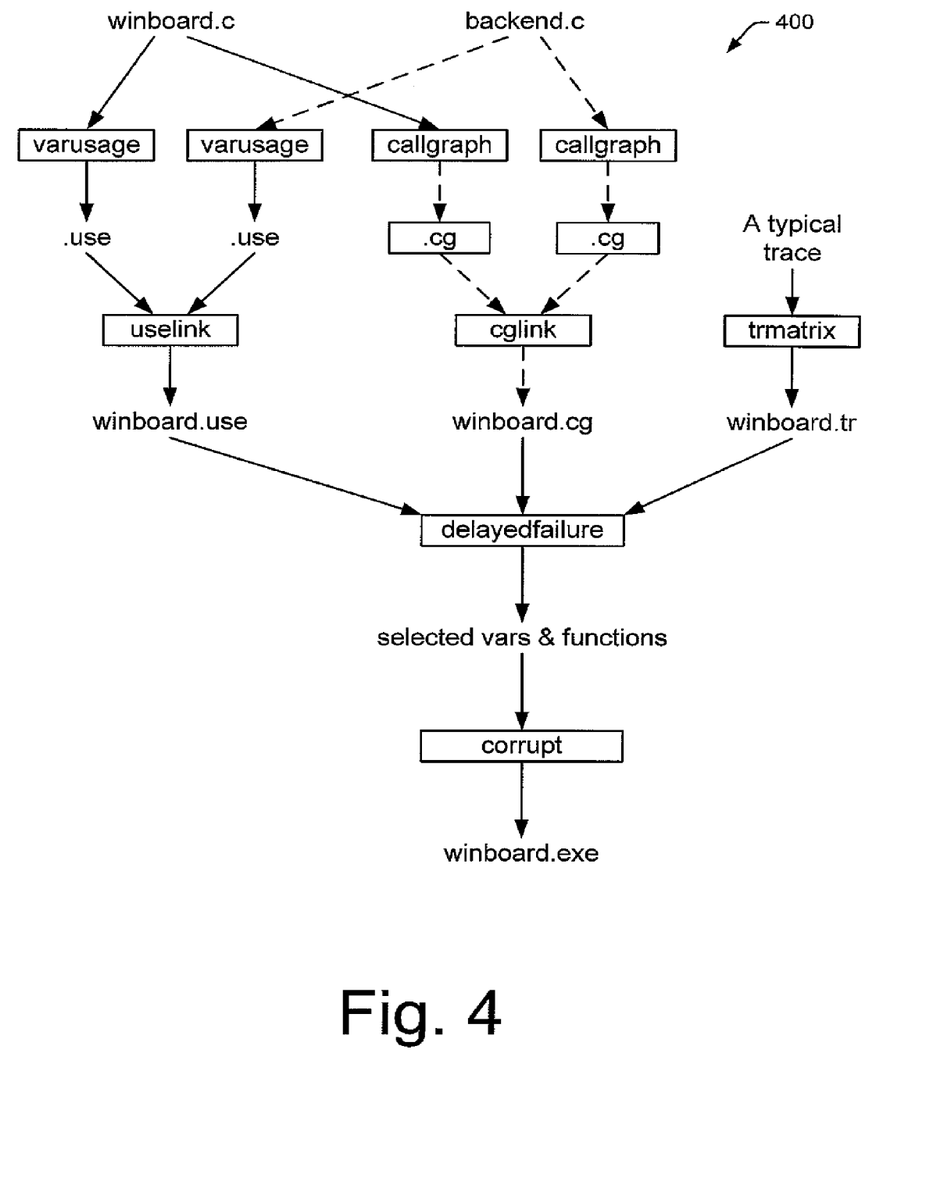
FIG. 4 illustrates an example system flow associated with a program.

FIG. 4 illustrates an example system flow 400 associated with a program. The example program is "Winboard", a chess program written in the C programming language. This particular program contains approximately 27,000 lines of C code and contains 297 global variables, which represent possible variables to corrupt. The Winboard program contains various source C files, such as winboard.c and backend.c. Each of these files is provided to a varusage module, which produces a ".use" file that identifies locations where global variables are used. Separate use files are linked together by a uselink module to produce a global use file. The source C files are also provided to a callgraph module that produces ".cg" files (also referred to as call graph files). Separate .cg files are linked together by a cglink module to produce a global call graph.

System flow 400 also illustrates the execution of profiling tools on the Winboard program to produce a dynamic trace. The dynamic trace records the order of entering and exiting functions as well as the corresponding timestamps. This trace is the input to the trmatrix module, which measures the average distance between two functions in terms of both elapsed time and the number of function calls, records the information into a matrix, and writes the matrix into a ".tr" file.

At this level in system flow 400, winboard.use, winboard.cg, and winboard.tr are provided as inputs to a delayedfailure module, which selects appropriate global variables and appropriate corruption sites following the guidelines and procedures discussed herein. The delayedfailure module first computes a set of good corruption sites for each global variable, following the algorithm below, then randomly selects some global variables and good corruption sites. Finally, a corrupt module performs source-to-source transformation to first create a layer of indirection to selected global variables, when necessary, and then plant the corruption of the global pointers into selected functions (on the condition that tampering is detected).

The following algorithm (illustrated using pseudo code) selects good corruption sites for a global variable.

```
Input:   a) example.c, with global variables g₁, g₂, ..., gₙ;
         b) Function-distance matrix T;
         c) δ: Threshold for the distance between corruption and failure
            sites.
Output:  The set of good corruption sites Cᵢ, for each gᵢ.
1:  Compute the call graph G of example.c
2:  for each global variable gᵢ, 1 ≤i ≤n do
3:      Cᵢ ← the set of all functions in example.c
4:      Identify the set of functions where the value of gᵢ is used, say
        {fᵢ₁, ... fᵢₘ}
5:      for each fᵢⱼ, 1 ≤j ≤m do
6:          Remove from Cᵢ all the ancestors of fᵢⱼ in the call graph G
7:          for each f remaining in Cᵢ do
8:              if T [f, fᵢⱼ] < δ then
9:                  remove f from Cᵢ
10:             end if
11:         end for
12:     end for
13:     Output Cᵢ for the global variable gᵢ
14: end for
```

As discussed above, this systems and procedures discussed herein protect software by making the software exhibit the effect of delayed failure after tampering is detected. To remove the tamper-response code, a hacker has to trace back from the crash site to analyze what is corrupted and where the corruption happens. Since pointer values are intentionally corrupted, the hacker has to attempt to debug the program with pointer-related bugs, which is very difficult. The situation is made more difficult for the hacker because the hacker does not generally have access to the source code.

Additional delay between corruption and failure can be achieved using the following techniques. Instead of setting the pointer value to NULL, the system can corrupt the pointer by adding random offsets to the pointer. In this situation, the cumulative effect of several corruptions will most likely crash the program, and the delay will be increased by this technique. In another situation, user-behavior models are analyzed to identify user-activated functions that are rarely called. For example, if a certain function is called approximately once an hour, then associating the corruption with that function can significantly increase the delay.

Figure 5:
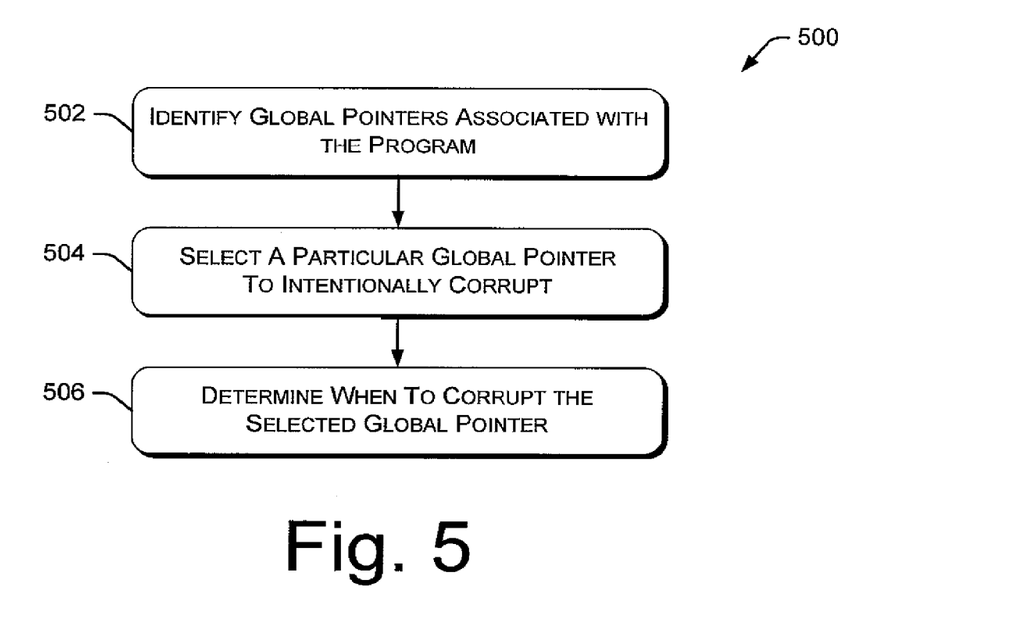
FIG. 5 is a flow diagram illustrating an embodiment of a procedure for adding a tamper-response mechanism to a program.

FIG. 5 is a flow diagram illustrating an embodiment of a procedure 500 for adding a tamper-response mechanism to a program. Initially, the procedure identifies global pointers associated with the program (block 502) and selects a particular global pointer to intentionally corrupt (block 504). For example, the procedure may use a parsing tool to parse the program to locate global pointers. Trace pointers are then used to determine when and how frequently the various global pointers are used. For example, it is generally desirable to select a pointer that is used frequently in normal program operation to make it difficult for a hacker to identify the pointer being corrupted. In one embodiment, a single global pointer is selected to be corrupted. In alternate embodiments, two or more global pointers are selected to be corrupted.

Procedure 500 continues by determining when to corrupt the selected global pointer (block 506). The selected global pointer can be corrupted immediately (e.g., upon detection of the program tampering) or at a future time (e.g., corresponding to a future event or calling a particular function).

Figure 6:
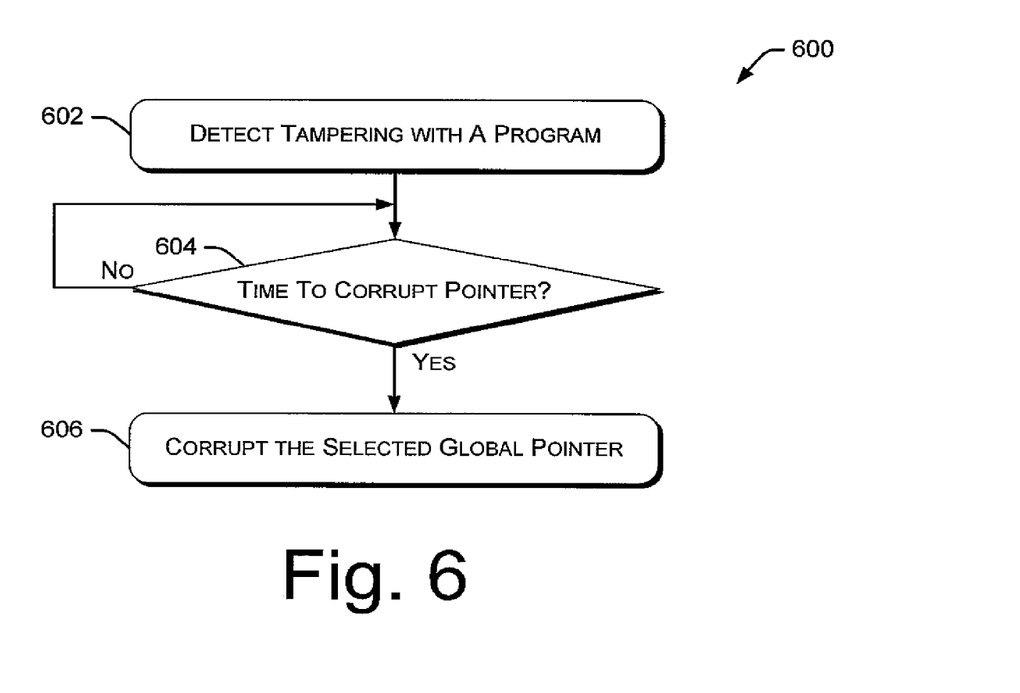
FIG. 6 is a flow diagram illustrating an embodiment of a procedure for responding to detection of tampering with a program.

FIG. 6 is a flow diagram illustrating an embodiment of a procedure 600 for responding to detection of tampering with a program. Initially, procedure 600 detects tampering with a program (block 602). Block 604 then determines whether it is time to corrupt the selected pointer. If it is time to corrupt the selected pointer, block 606 corrupts the selected global pointer using one or more of the corruption techniques discussed herein. If it is not time to corrupt the selected pointer, the procedure waits until the appropriate time occurs.

Particular examples discussed herein terminate or "crash" a program using corrupted pointers. However, it will be appreciated that various other techniques may be used to accomplish the same result. In particular, any technique can be used that introduces covert and delayed tamper response into a program, regardless of the actual mechanism that causes the program to deviate from its "normal" execution.

In certain programming languages, such as C# and Java, pointers and global variables may not be available or may be limited to atypical usage. In these situations, other techniques are useful in separating the tamper detection activity from the tamper response activity. For example, set an array index to fall outside the array's limits, thereby causing an "array out-of-bounds error". In another example, a variable in a loop-condition test is changed to result in an infinite (or at least very time-consuming) loop. These techniques may require implicit data-based links between the code at the detection site and the response site. Although global variables in C/C++ serve to create such connections, proper object-oriented design generally stipulates object isolation and tightly controlled data flow. However, some object fields (e.g., public static members in C#) serve essentially as global variables. Some applications also use dedicated namespaces and classes that encapsulate global data, which can also substitute for true global variables.

The number of opportunities for delayed responses can be increased by performing various semantically-equivalent code transformations that break object isolation. For example, a constant loop endpoint or an API-function argument is converted to a public static variable that can be modified to effect a tamper response. If a good response location does not contain suitable code, new code is added that references such variables, such as a new loop or a new system-API call.

Certain corruption techniques do not cause failures as predictably as pointer corruption. However, slow degradation of the program's performance can be even more difficult to identify and analyze than definite failures. Any particular response may not terminate the program, but if one or more checks continue to fail, the cumulative effect causes the program performance to degrade and should eventually make the program unusable. Both the checks and responses can be made probabilistic in terms of space-time separation and response action.

Additionally, a program can degrade its functioning via slowdown, high resource usage, and arbitrary incorrect operation, such as file corruption or graphics distortion. These techniques may be generic and automated for example, transforming program loops to include conditions that take increasingly longer time to satisfy, such as gradually incremented counters. Although such application-specific techniques require manual design and implementation, these techniques could be quite effective (e.g., a game where the player's movements and aim become increasingly erratic).

Figure 7:
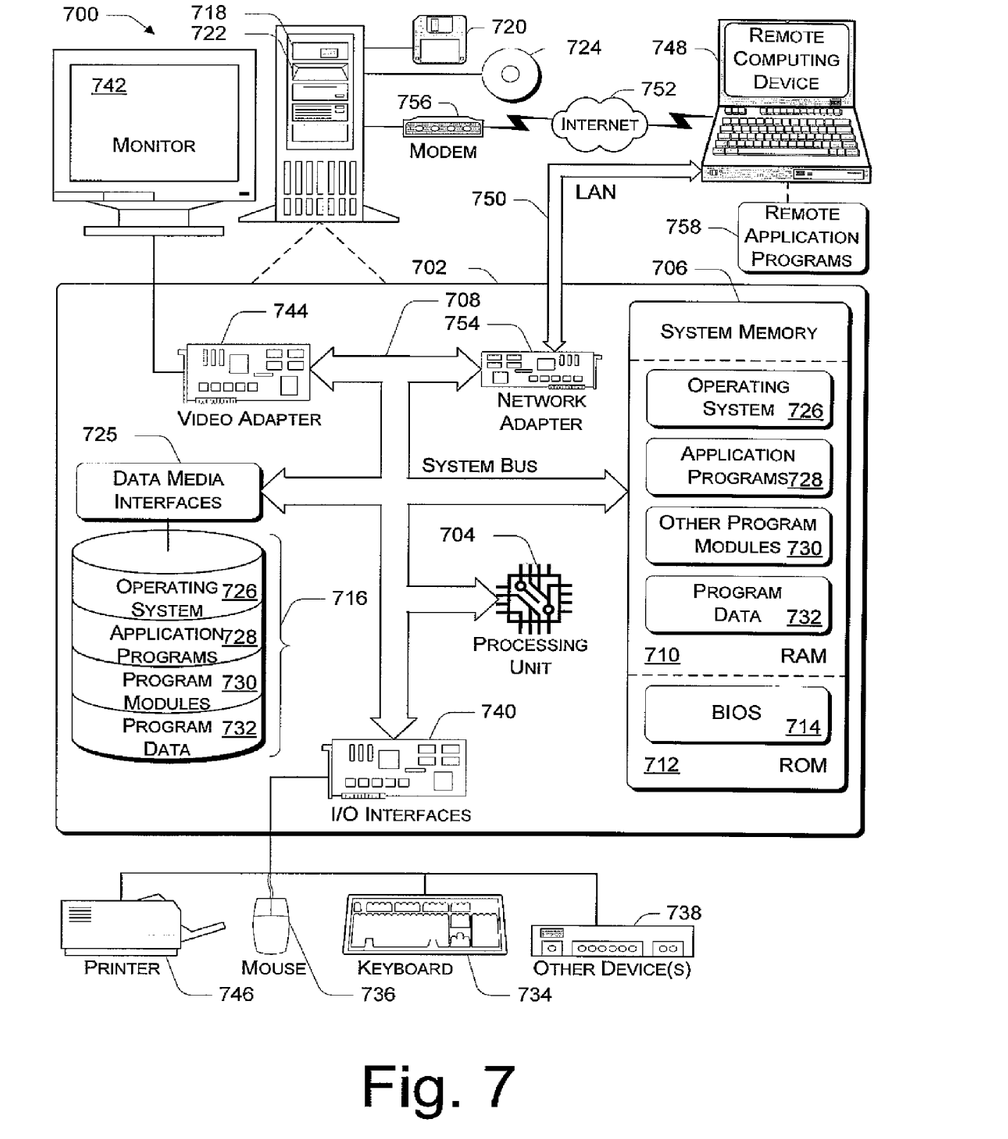
FIG. 7 illustrates an example general computer environment, which can be used to implement the techniques described herein.

FIG. 7 illustrates an example general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

Computer environment 700 includes a general-purpose computing device in the form of a computer 702. Computer 702 can be, for example, a desktop computer, a handheld computer, a notebook or laptop computer, a server computer, a game console, and so on. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 725. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the bard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse") Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Although the description above uses language that is specific to structural features and/or methodological acts, it is to be understood that the invention defined in the appended claims is not limited to the specific features or acts described Rather, the specific features and acts are disclosed as exemplary forms of implementing the invention.

The invention claimed is:

1. A method comprising:
    identifying, by one or more computing devices configured to respond to detected program tampering, global pointers associated with a program;
    selecting, by the one or more computing devices, a particular global pointer to intentionally corrupt;
    determining, by the one or more computing devices, a time to corrupt the selected global pointer; and intentionally corrupting, by the one or more computing devices, the selected global pointer in response to detecting tampering with the program, wherein the corrupting includes setting a value of the selected global pointer to NULL or to a value outside of program address space.

2. A method as recited in claim 1 wherein identifying global pointers includes parsing the program to locate global pointers.

3. A method as recited in claim 1 further comprising analyzing trace pointers to determine when the identified global pointers are used.

4. A method as recited in claim 1 further comprising analyzing trace pointers to determine the frequency with which the identified global pointers are used.

5. A method as recited in claim 1 wherein selecting a particular global pointer to intentionally corrupt includes selecting a global pointer that is used frequently by the program.

6. A method as recited in claim 1 further comprising selecting a second global pointer to intentionally corrupt.

7. A method as recited in claim 1 further comprising:
selecting a second global pointer to intentionally corrupt;
determining a time to corrupt the second global pointer; and
intentionally corrupting the second global pointer at the determined time.

8. A method as recited in claim 1 wherein the time to corrupt the selected global pointer is associated with a future event.

9. A method as recited in claim 1 wherein the time to corrupt the selected global pointer is associated with calling a particular function.

10. A method as recited in claim 1 wherein intentionally corrupting the selected global pointer causes the program operation to terminate at a future time.

11. A method as recited in claim 1 wherein intentionally corrupting the selected global pointer causes the program performance to degrade over time until the program becomes unusable.

12. A method comprising:
determining, by one or more computing devices configured to detect program tampering, a manner of responding to detected tampering with a program, wherein the manner of responding causes-the program to terminate normal operation;
determining, by the one or more computing devices, when to respond to the detected tampering, wherein the response occurs at a future time; and
upon detection of tampering with the program, implementing, by the one or more computing devices, the response at the determined time, wherein the manner of responding includes setting an array index to fall beyond the array's limits.

13. A method as recited in claim 12 wherein the manner of responding includes corrupting a pointer in the program.

14. A method as recited in claim 12 wherein the manner of responding includes changing a program setting to produce an infinite loop.

15. A method as recited in claim 12 wherein the manner of responding includes corrupting at least one object field.

16. A method as recited in claim 12 wherein the manner of responding includes creating at least one indirection pointer in the program.

17. A method of responding to detection of tampering with a program, the method comprising:
detecting, by one or more computing devices configured to detect program tampering, locations where global variables are used in the program;
generating, by the one or more computing devices, a global call graph associated with the program;
generating, by the one or more computing devices, a dynamic trace associated with the program, wherein the dynamic trace identifies entering and exiting functions in the program;
selecting, by the one or more computing devices, global variables and corruption sites based on the global variables, the global call graph, and the dynamic trace; and
corrupting, by the one or more computing devices, the selected global variables at the corruption sites by adding random offsets to the global variables.

18. A method as recited in claim 17 wherein corrupting the selected global variables includes placing corrupted global variables into selected program functions.

* * * * *